E. A. BAYLIS.

PROTECTIVE COVERING FOR CONCENTRATOR TABLES AND METHOD OF APPLYING THE SAME.

APPLICATION FILED MAY 25, 1914.

Reissued Sept. 21, 1915. 13,981.

Inventor

Everest A. Baylis

Witnesses

J. R. Heinrichs

A. C. Hines.

By Arnold J. Hall

Attorney

COLUMBIA PLANOGRAPH CO., WASHINGTON, D. C.

UNITED STATES PATENT OFFICE.

EVEREST A. BAYLIS, OF MADERA, MEXICO, ASSIGNOR TO J. A. McMAHON, OF EL PASO, TEXAS.

PROTECTIVE COVERING FOR CONCENTRATOR-TABLES AND METHOD OF APPLYING THE SAME.

13,981. Specification of Reissued Letters Patent. Reissued Sept. 21, 1915.

Original No. 1,037,579, dated September 3, 1912, Serial No. 577,131. Application for reissue filed May 25, 1914. Serial No. 840,965.

*To all whom it may concern:*

Be it known that I, EVEREST A. BAYLIS, a citizen of the United States, residing at Madera, in the State of Chihuahua, Republic of Mexico, have invented certain new and useful Improvements in Protective Coverings for Concentrator-Tables and Methods of Applying the Same, of which the following is a specification.

This invention relates to concentrator tables such as are used in connection with ore milling and the cyanid and other processes of extracting the metallic content from ores.

The invention relates to a protective covering for such tables and the method of applying the same to the tables.

It is well known in the art that concentrator tables for use in ore milling and with the cyanid and other processes must have a protective covering of some sort and heretofore it has been customary to cover such tables with linoleum. This material has proven defective as a covering because of the fact that when first applied it is more or less wavy and the tables cannot be used immediately. It is also defective because it is quickly worn away by the friction of the material. It is also defective in that the material from which the linoleum is made, being linseed oil, is acted upon by the cyanid or other solution so that it is softened and roughened and is also acted upon by any lime that may be contained in the material passing over the table, with the result that deposits of lime scale (calcium carbonate) are made, thus forming lumps and making the surface of the table uneven.

The principal object of the present invention is the provision of a protective cover for milling and cyanid and other extraction and reduction process tables which will not be acted upon by either cyanid or strong lime or other solutions, and which is wear-resisting to a high degree.

A second object of the invention is the provision of a method of applying the protective cover so that it may be used quickly after the table is prepared.

To this end the invention consists in general of a protective covering for cyanid tables composed of a suitable fabric, such as canvas, painted and applied in a novel manner.

Figure 1:
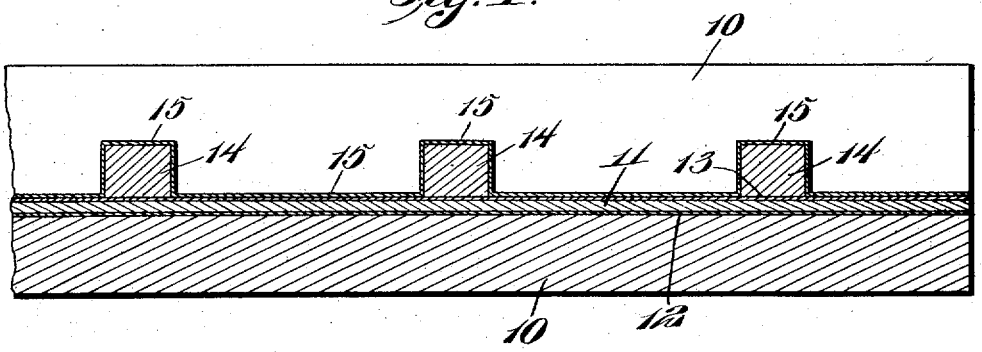
Figure 2:
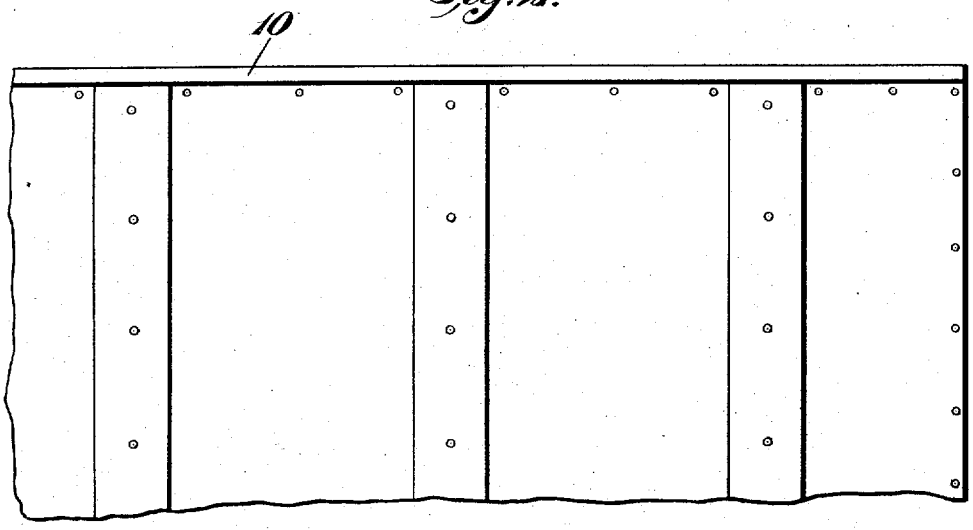

In the accompanying drawings: Figure 1 is a section through a portion of a cyanid table to which the protective covering has been applied. Fig. 2 is a plan view of a portion of such a table.

In this drawing, the numeral 10 indicates a portion of a concentrator table which is adapted to be reciprocated longitudinally by any suitable means (not shown).

At 11 is shown a canvas cover between which and the table is a coat of paint 12, while on top of the cover is a second coat of paint 13. On the second coat of paint rest the riffles 14.

At 15 is the third and final coat of paint which is applied over the riffles and the second coat of paint between the riffles. The paint which is used is a peculiar paint commonly called throughout the United States "P. & B. paint," and this paint, I have discovered, has the peculiar properties of resisting the actions of acid, alkali, heat, cold, and is especially powerful in resisting the action of potassium cyanid.

The method of applying this cover is as follows: A strip of canvas of suitable size, preferably number 10 duck, is cut out to the proper size to fit the table. One side of this canvas is then painted with the "P. & B." paint. This canvas is then applied to the table with the painted side down, stretched tightly and tacked. By having this single coat of paint on the canvas the latter may be made to lie very snugly on the table and the stretching process is much facilitated. After the canvas has thus been stretched a second coat of "P. & B." paint is applied. The riffles are then nailed on the table and a third coat of "P. & B." is applied to cover the riffles and that portion of the canvas between said riffles. When the third coat of paint has dried the table is ready for use. The "P. & B." paint herein referred to is that described in the United States Letters Patent No. 348,995, granted September 14, 1886, and comprising a compound of bisulfid of carbon and maltha, the said paint being designed for the treatment of wall paper, wrapping paper, roofing paper and the like for the purpose of rendering the paper waterproof, of increased strength and of less imflammability than ordinary paper. I have discovered that such a paint, containing maltha as its base, and combined with bisulfid of carbon or its equivalent as a vehicle, possesses other and, for certain purposes, more valuable properties, in that, when applied to a textile fabric, such as canvas or the like, it is peculiarly valuable in the production of a protective covering for the concentrator tables used in ore milling and cyanid and other extraction processes. Its peculiar value in this connection resides in the fact that it not only resists the actions of acid, alkali, heat, cold, water, and particularly potassium cyanid, but also to a remarkable degree toughens and renders the fabric highly resistant to wear from friction, thus preventing the rapid wearing out of the fabric from the friction of the ore and other moving particles in the reduction or concentration process.

My invention, therefore, resides broadly in a concentrator table having a protective covering consisting of a textile fabric coated or saturated with a resistant including maltha, as I believe that I am the first to discover the aforementioned properties of such substance and to utilize the same for the purpose described.

By the use of the term "impregnated" in the claims I mean either coated (on one or both sides) or completely saturated.

Having thus described the invention, what is claimed as new is:

1. The combination with a concentrator table; of a cover therefor comprising canvas painted on one side with "P. & B." paint and stretched over and secured to said table, the painted side being undermost, a second coat of said paint covering the upper side of said canvas, riffles secured to said table on top of said cover, and a third coat of said paint covering said riffles and cover.

2. The process of preparing a concentrator table which consists in coating a canvas cover with a paint capable of resisting the actions of potassium cyanid and alkaline solutions, applying the canvas to the table with the painted side down, stretching and securing the canvas to the table, applying a second coat of the same paint to the stretched canvas, securing riffles on top of said cover, and finally applying a third coat of the same paint.

3. A concentrator table having a protective covering comprising a woven textile fabric impregnated with a resistant paint including maltha.

4. A concentrator table having a protective covering comprising canvas impregnated with a resistant paint including maltha.

5. A concentrator table having a protective covering comprising a woven textile fabric coated on both sides with a resistant paint including maltha.

6. A concentrator having a homogeneous surface covering including a paint containing maltha, exposed to direct contact with the material being concentrated.

7. The process of preparing a concentrator table which consists in coating a woven textile fabric cover with a resistant paint including maltha, applying the cover to the table with the painted side down, stretching and securing the cover to the table, and applying a second coat of the same paint to the stretched cover.

In testimony whereof, I have affixed my signature in the presence of two witnesses.

EVEREST A. BAYLIS.

Witnesses:
JAS. U. SWEENEY,
W. M. COLDWELL.

Copies of this patent may be obtained for five cents each, by addressing the "Commissioner of Patents, Washington, D. C."